United States Patent [19]

Grima et al.

[11] Patent Number: 4,520,479
[45] Date of Patent: May 28, 1985

[54] ARRANGEMENT FOR RE-ARRANGING INFORMATION FOR TRANSMITTING OUTGOING TIME-DIVISION MULTIPLEXED INFORMATION OBTAINED FROM INCOMING TIME-DIVISION MULTIPLEXED INFORMATION

[75] Inventors: Jean-Claude Grima, Chatillon; Bernard Pando, Versailles; Guy A. J. David, Thiais, all of France

[73] Assignee: U.S. Philips Corporation, New York, N.Y.

[21] Appl. No.: 491,508

[22] Filed: May 4, 1983

[30] Foreign Application Priority Data

May 5, 1982 [FR] France ................... 82 07788

[51] Int. Cl.³ .......................... H04J 3/16; H04Q 11/04
[52] U.S. Cl. ............................................. 370/84; 370/68
[58] Field of Search ................................. 370/68, 84

[56] References Cited

U.S. PATENT DOCUMENTS

| 4,168,401 | 9/1979 | Molleion et al. | 370/84 |
|---|---|---|---|
| 4,206,322 | 6/1980 | Lurtz | 370/84 |
| 4,258,434 | 3/1981 | Glowinski et al. | 370/84 |
| 4,277,843 | 7/1981 | Duquenne et al. | 370/84 |
| 4,310,922 | 1/1982 | Lichtenberger et al. | 370/84 |
| 4,322,844 | 3/1982 | Fellinger et al. | 370/84 |
| 4,354,261 | 10/1982 | Hages et al. | 370/84 |
| 4,377,859 | 3/1983 | Dunning et al. | 370/68 |
| 4,402,079 | 8/1983 | Fellinger et al. | 370/84 |
| 4,425,641 | 1/1984 | French et al. | 370/68 |

Primary Examiner—Douglas W. Olms
Assistant Examiner—Curtis Kuntz
Attorney, Agent, or Firm—Thomas A. Briody; William J. Streeter

[57] ABSTRACT

This arrangement for re-arranging information has for its object to transmit time-division multiplexed information obtained from incoming time-division multiplexed information. These multiplexers are formed by fast-rate channels and slow-rate channels; the arrangement for re-arranging information comprises a set of memories (M0 to M7) which have a data input (12) and a data output (SM) and to which there are connected on the one hand a write circuit (21) for writing therein, at the rate of the incoming multiplexed information, the information from this multiplex, and on the other hand, a read circuit (50) for applying to the outgoing multiplex, at its rate, the information contained in the said set of memories. The arrangement further comprises a delay element (55) which cooperates with change-over means (25 and 60) for delaying the information from the slow-rate channels at the output of the said set of memories and a combining circuit connected to the data output of the set of memories and to the said delay element for producing the outgoing multiplexed information.

3 Claims, 8 Drawing Figures

ARRANGEMENT FOR RE-ARRANGING INFORMATION FOR TRANSMITTING OUTGOING TIME-DIVISION MULTIPLEXED INFORMATION OBTAINED FROM INCOMING TIME-DIVISION MULTIPLEXED INFORMATION

The invention relates to an arrangement for rearranging information for transmitting outgoing time-division multiplexed information obtained from incoming time-division multiplexed information, the said time multiplexes being provided for fast-rate channels and for slow-rate channels, the fast-rate channels being formed by time periods arranged in a frame, while the slow-rate channels are formed by time periods distributed over consecutive frames and arranged in a multi-frame which encompasses a plurality of frames, this arrangement for rearranging information being formed by a set of memories having a data input and a data output and to which there are assigned on the one hand a write circuit for writing therein at the rate of the incoming multiplexed information from this multiplex, and on the other hand a read circuit for applying to the outgoing multiplex, at its rate, the information contained in the said set of memories.

Such an arrangement is described in French Patent Specification No. 2,165,182 (PHN.6284); reference is more specifically made to FIG. 4 and to the description relating to that figure. In this arrangement the set of memories is formed of two groups, one group being intended to store the information from the fast channel, the other the information from the slow channel, the write and read circuits of these groups being separate circuits.

The present invention has for its object to improve this prior art arrangement, the improvements consisting of a simplification of the circuits.

For that purpose, an arrangement of the type described in the opening paragraph is characterized in that a delay element is provided which cooperates with change-over means for delaying the information from the slow channel at the output of the said set of memories, and a combining circuit connected to the data output of the set of memories and of the said delay element to supply the outgoing multiplexed information.

The following description will make it better understood how the invention can be put into effect, the description being given by way of non-limitative example with reference to the accompanying drawings.

FIG. 1 shows the organisation of a multiplex having two channel outputs, one being a fast-rate channel and one being a slow-rate channel.

The fast channels are formed by time slots I0, I1, I2, . . . I247, arranged in different frames TR0, TR$_1$, . . . TR2047. Let it be assumed, that these time slots each contain a binary element.

The slow channels are formed by time slots located at the frame ends and after the period I247; these time slots S contain eight binary elements and are provided in the time intervals IT248 to IT 255, which will be described hereinafter. The slow channel CS0 is formed from slots S of the frames TR0, TR1, . . . TR6; the channel CS1 of the frames TR8, TR9, . . . TR14, etc . . . the time slots S of the frames TR7, TR15, . . . TR2047 contain the frame code T employed to define the time intervals I0, I1, . . . , the slots S of the frames TR2040 to TR2046 (i.e. channel CS255) contain the multiframe code $\overline{T}$ (complementary to code T) which allows the allocation of numbers to the different channels CS0, CS1, . . . CS255.

Figure 2:
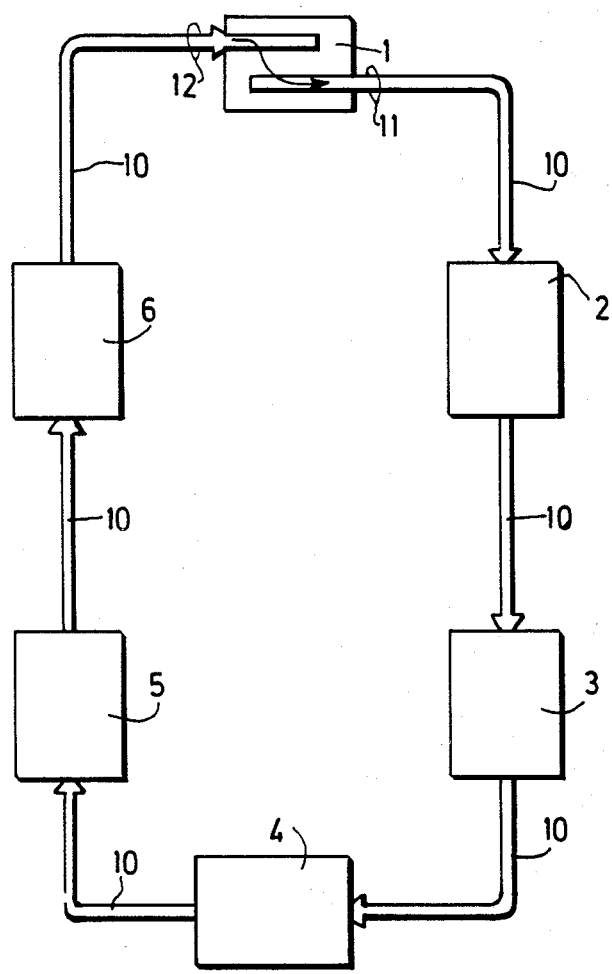
FIG. 2 shows a loop system comprising a re-arrangement arrangement.

In FIG. 2 the arrangement for re-arranging information is given reference numeral 1. It is included in a loop telecommunication system of the type described in the above-mentioned French Patent Specification No. 2,165,182. This system allows the interchange of information between differnet units 2, 3, 4, 5, 6. These units are interconnected by a line 10 through which the information is transmitted in the direction indicated by the arrow. Reference numeral 11 denotes an output of the arrangement 1 at which the outgoing multiplex information appears and reference numeral 12 denotes the input for the incoming multiplexed information.

Figure 1:
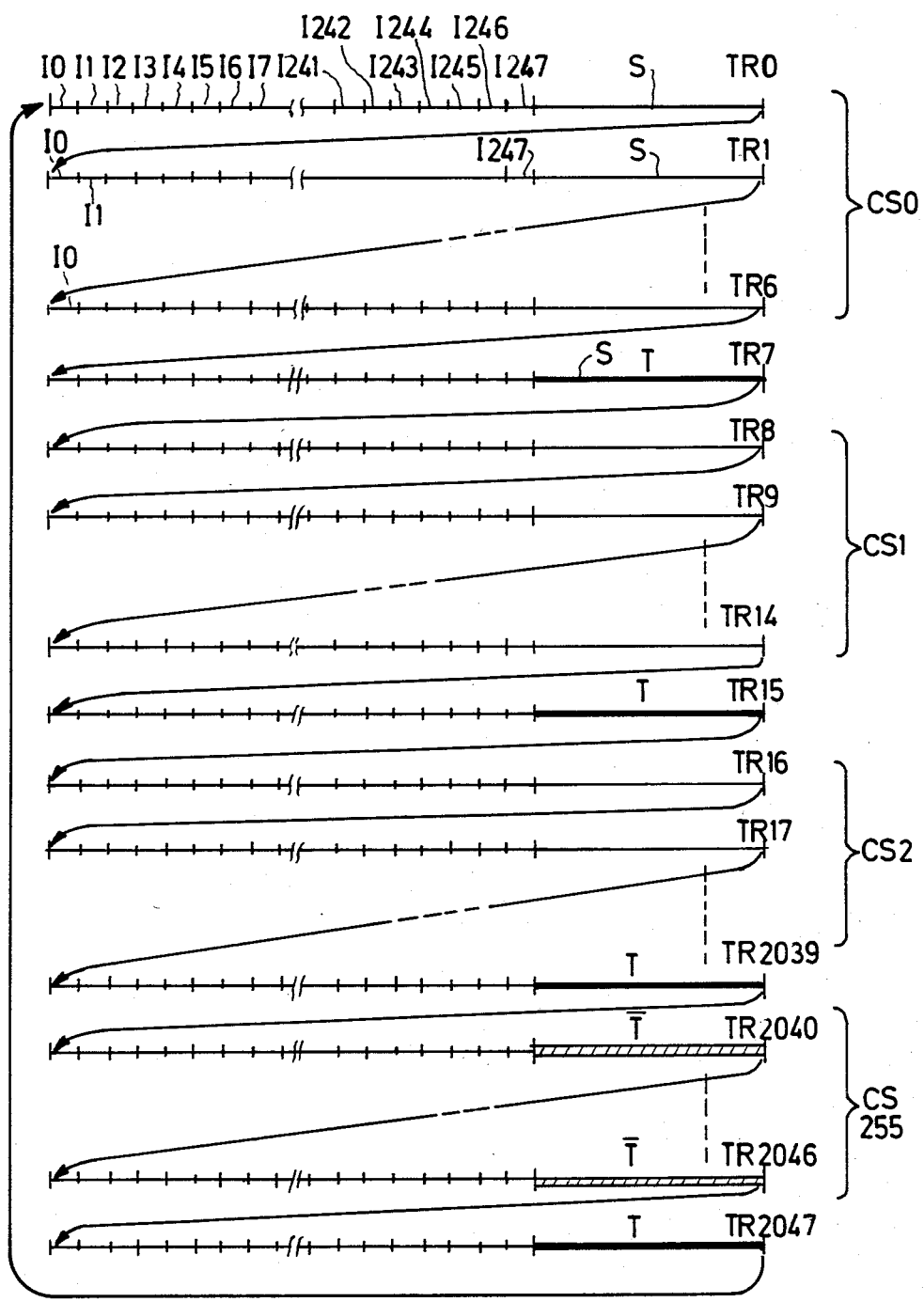
FIG. 1 shows the organization of a multiplex comprising fast channels and slow channels.
Figure 3:
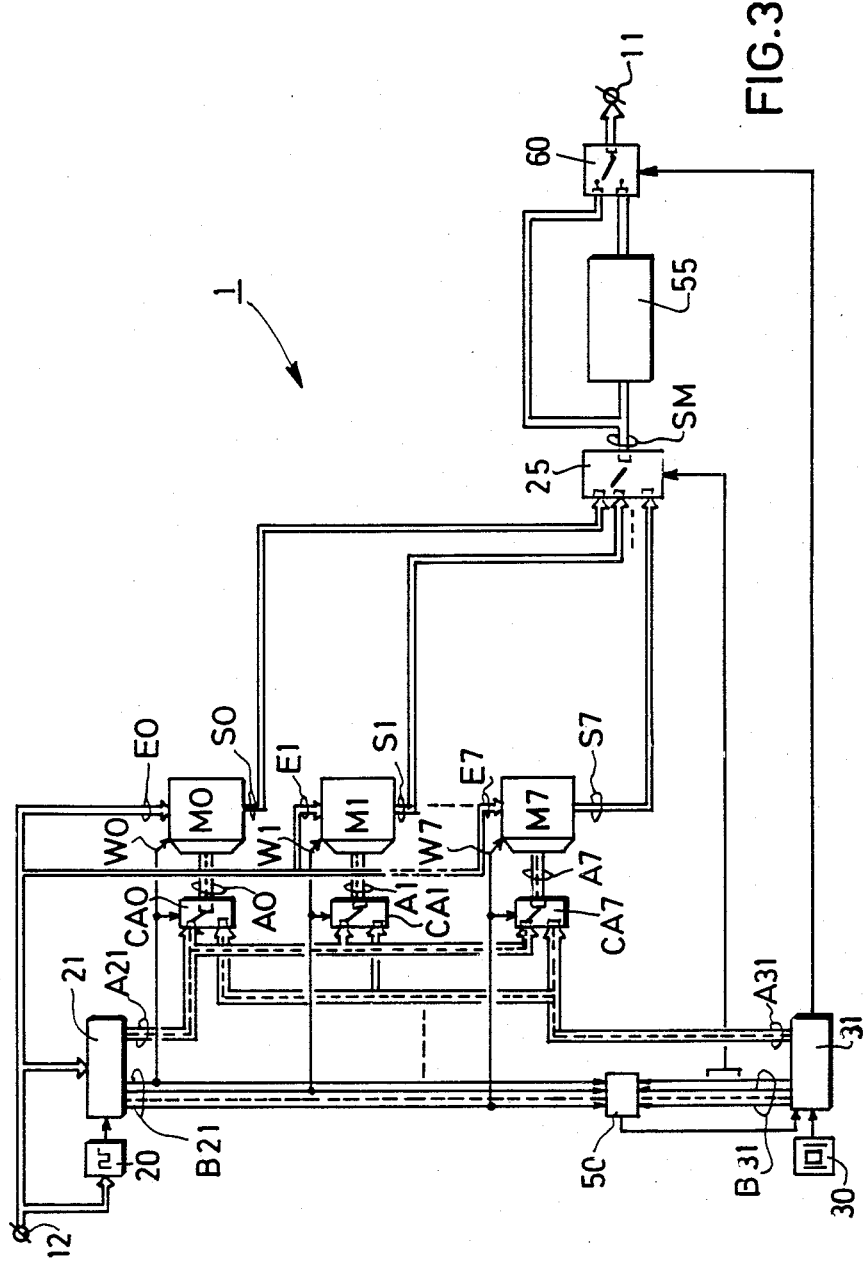
FIG. 3 shows in greater detail the embodiment of a re-arrangement arrangement in accordance with the invention.

FIG. 3 shows in greater detail the arrangement shown in FIG. 1. The line 10 is connected to the input 12 and to the output 11. A clock circuit recovers the rate of the information appearing at the terminal 12 and applies its signals to a synchronizing circuit 21 which by detecting the different codes of the frame T and the multiframe $\overline{T}$ processes the signals to allow writing of the information of the incoming multiplex into a group of memories M0, M$_1$, . . . M7. These memories M0, M1, . . . M7 have the respective inputs E0, E1, . . . E7, which are each connected to the input 12, and outputs S0, S1, . . . S7, which are connected to the output SM of the group of memories via a change-over switch 25, writing control inputs W0, W1, W7 connected to the circuit 21 and inputs for address codes A0, A1, . . . A7.

In order to fix the rate of the outgoing multiplex a quartz oscillator 30 is provided which is followed by a clock signal generating circuit 31. This circuit 31 produces different signals which are used to read the memories M0, M1, . . . M7. In the example described each memory has for its object to record a frame, that is to say 256 binary elements. First wires A21 which are connected to the output of the circuit 21 convey a binary modulo-256 number which is developed at the binary rate of the incoming multiplex. These codes, conveyed via the wires A21 and A31, are used as the address codes for the memories M0 to M7. The change-over switches CA0, CA1, . . . CA7 determine which one of the address codes of the wires A21 or A 31 is applied to the inputs A0, A1, . . . A7. The position control signals of these change-over switches are coupled to the write controls of the memories so that when the wires A21 are connected to the inputs for the address code of the memories these memories are adjusted to the write position. Second wires B21 are respectively connected to the control W0, another one to the control W1 . . . etc . . . Second wires B31 connected to the output of the circuit 31 allow selection of the memories in the read mode; for this purpose they are connected to the control of the changeover switch 25. A code comparator 50 compares the code present on the wires B21 and B31 and when they are identical, acts on the circuit 31 to block the development of the code on wires 31.

A delay element 55 which produces a delay of 16384 binary elements is connected to the output SM. A change-over switch 60 renders it possible, when it is in a first position, to convey the information of the channels I in the outgoing multiplex to the terminal 11 which terminal 11 is then connected to the output SM and when this change-over switch in a second position, to convey the information of the channels CS with the codes T and $\overline{T}$ in the multiplex, the terminal 11 then being connected to the output of delay 55.

The operation of the arrangement in accordance with the invention will now be further described with reference to the FIGS. 4 and 5.

Figure 4:
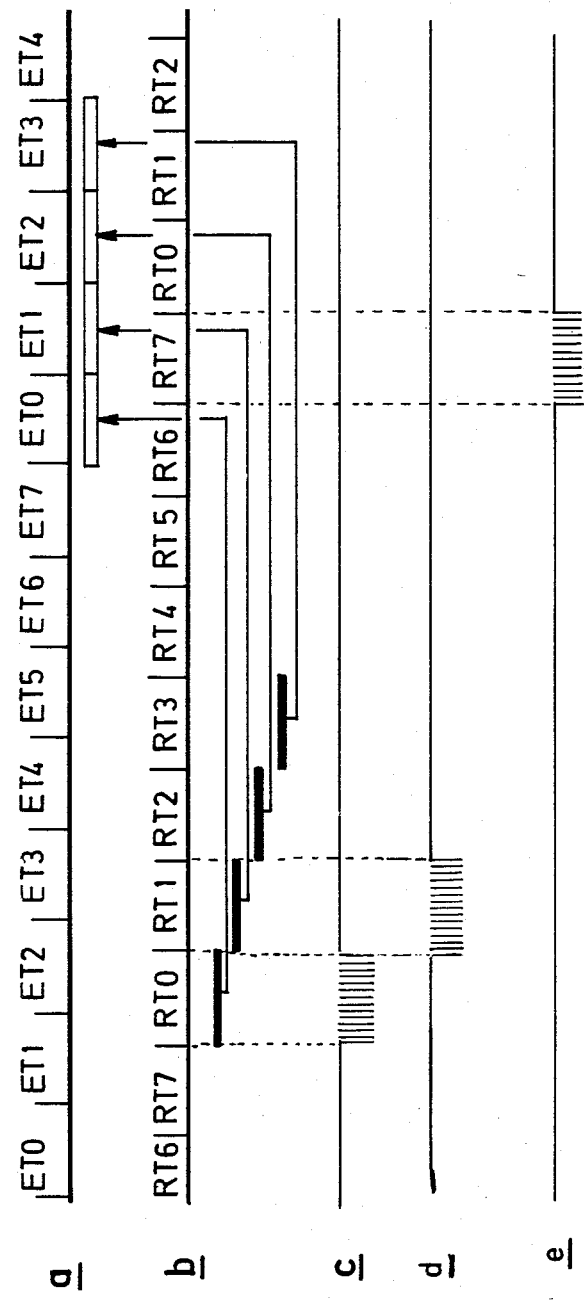
FIGS. 4 and 5 are used to illustrate the operation of an arrangement in accordance with the invention.

The outgoing multiplex is shown at line a of FIG. 4. Only the eight consecutive frames ET0, ET1, ... ET7 will be described, which corresponds to the fact that the eight consecutive frames RT0, RT1 ... RT7 will be described, which are recorded in the respective memories M0 to M7. The re-arrangement operation is formed by putting the information contained in the frame RT0 in the frame ET0, the information of the frame RT1 in the frame ET1, and so forth.

As mentioned in the foregoing, the frame RT0 is recorded in the memory M0. To that end the write control W0 is activated and the code on the wires A21 is applied to the inputs A0, (see line c of FIG. 4), thereafter the frame RT1 is recorded (line d) and so on until the frame RT7 (line e). When the frame ET0 is to be transmitted, the memory M0 which contains the information of the frame RT0 will be read and the same procedure is effected for the other frames.

Figure 5:
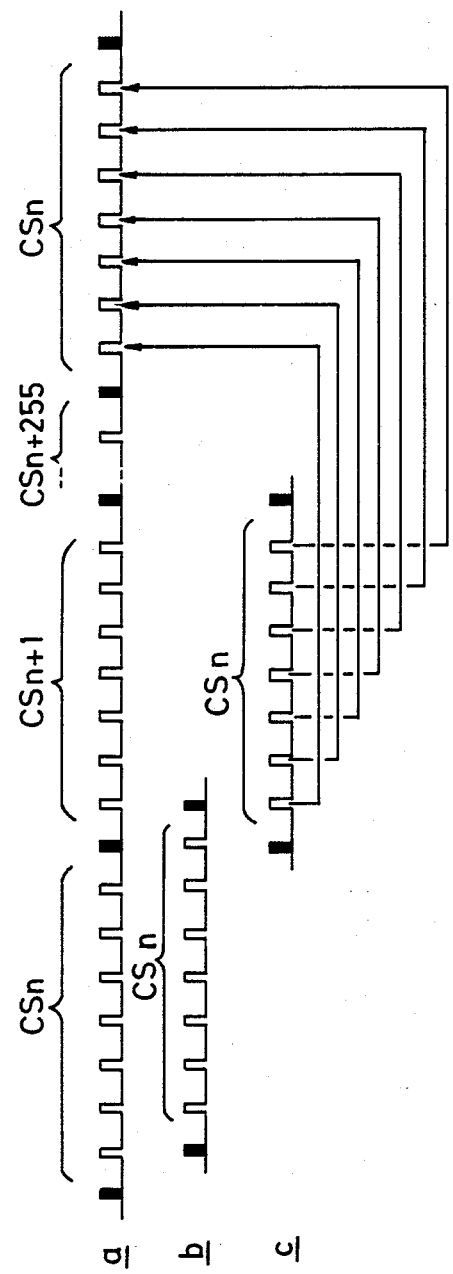

In FIG. 5 there are shown in the form of pulses the different eight-bit bytes which form the channels CS. The black pulses represent the reference eight bit byte of the frame code or the multi-frame code. The line a represents the transmitted multiplexed information, the line b the received multiplexed information and, line c represents the multiplexed information at the output SM. The multiplexed information at this output is shifted through eight frames relative to the multiplexed information to be transmitted. So as to ensure that the information corresponds to the proper number of the channel the eight-bit bytes of the channels CSi must be shifted for a time period equal to 16384 binary elements.

Figure 6:
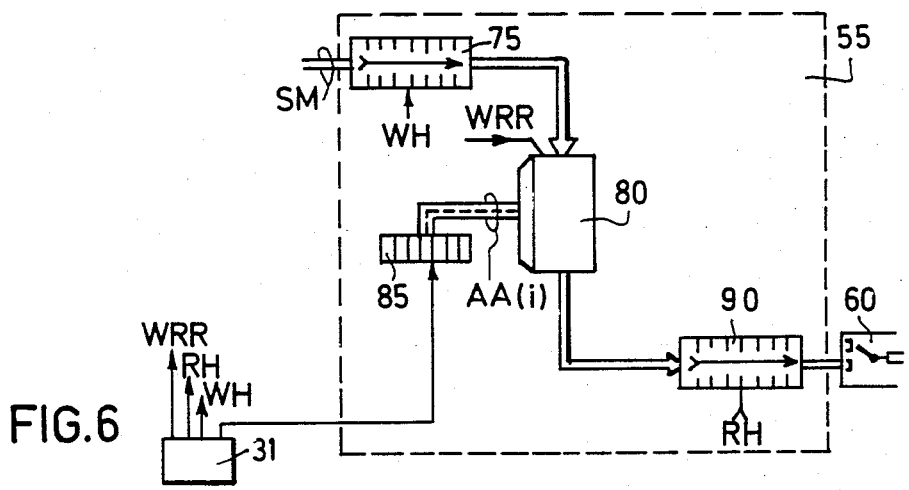
FIG. 6 shows an embodiment of a delay element which is part of the arrangement in accordance with the invention.

FIG. 6 shows in detail the embodiment of the delay element 55. The delay is primarily provided by a shift register 75, whose input is connected to the output SM and whose output is connected to the data input of a memory 80 which is organized in 16384 words of one binary element each; the addresses AA (i) of these words are produced by a module "16384"-counter 85. The output of the memory 80 is connected to the input of a shift register 90 whose output is connected to the change-over switch 60. The shifting operations of these registers 75 and 90 are controlled by the signals which are transmitted via the wires WH and RH, respectively; establishing the memory 80 in the writing or reading mode is controlled by a signal transmitted over a wire WRR. Advancing the counter 85 is controlled by the circuit 31 to which the wires WRR and WH are connected.

How this delay element operates will now be described first with reference to FIG. 7.

At line a of this Figure the different time intervals I which constitute the different frames are shown. The characters I are not added to these numbers for the sake of clarity of the Figure. The intervals numbered 248 to 255 are associated with a frame TRJ, while the intervals numbered from 0 ... 34 are associated with the subsequent frame TR (j+1). These frames are considered in the region of the terminal SM. The line b shows the shape of the signal transmitted over the wire WH. Only the ascending edges of this signal are active: the edges F1, F2, ... F8; they make it possible to record in the register 75 the binary element contained in the time intervals I248, 249 ... 255, so that the binary element following after the edge F8 at the input of the memory 80 is the binary element which is contained in the time interval I248 (line c). This binary element is recorded at the address AA(i), (line d) produced by the counter 85 when the signal on the wire WWR assumes the value "0" (line e point L0). Before this recording operation the preceding binary element in the same location defined by the address AA(i) is applied to the shift register 90 at the ascending edge F10 of the signal transmitted over the wire RH. This binary element was recorded the last time the counter 85 produced the address AA(i). This binary element was contained in a time interval of a frame TR (j+1-2040) i.e. TR(j-2039). The binary elements of the time intervals I248 to I255 of the frame TR(j-2040) (line g) are transmitted during the ascending edges F11 to F18 which were previously present following the ascending edge F10 of the signal present on the wire RH (line f). The ascending edges F1 to F8 on the one hand and the ascending edges F11 to F18 on the other hand succeed each other at a fast rate which is the same as the rate of the time interval I; the following edges F20 ... of the carrier signal on the wires RH have a much lower rate; they succeed each other with intervals which are equal to 16 times the duration of a binary element. The transition to "0" of the signal on the wire WWR and the progression of the counter 85 are produced at this same rate.

Figure 7:
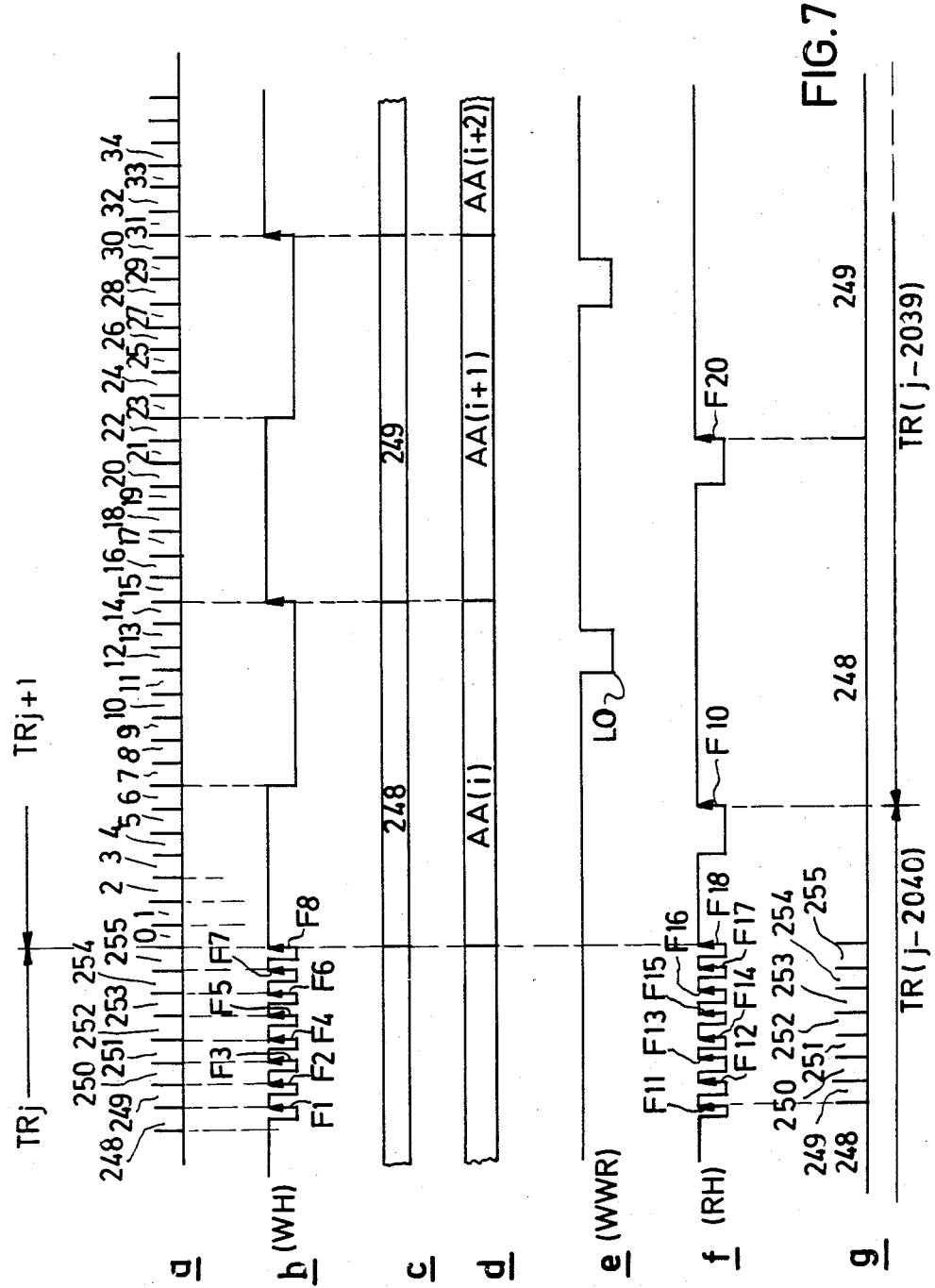
FIGS. 7 and 8 are used to illustrate the operation of the delay element.
Figure 8:
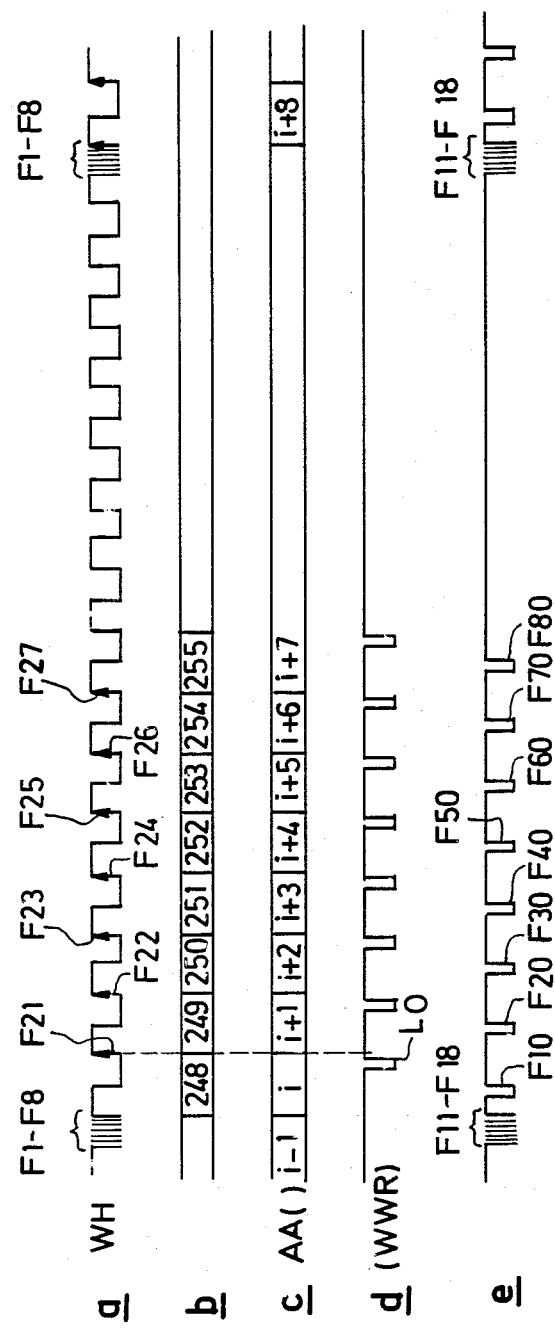

FIG. 8 shows substantially the same signals as those of FIG. 7, but on a larger time scale; in this Figure the reference numerals relating to the same events as in the preceding Figure are identical. Between the edges F1–F8 which correspond to two successive frames there are sixteen regularly distributed edges. Of these edges the first seven edges F21–F27 are active and allow the recording in memory 80 at a slow rate, of the data contained in the register 75. The above-mentioned edges F10, F20 and the edges F30, F40, F50, ... F80 enable the storage of the data present at the output of the memory 80 in the register 90. The data are transmitted, as mentioned in the foregoing, when the ascending edges F11–F18 are present.

What is claimed is:

1. Apparatus for transmitting outgoing time division multiplexed information obtained from incoming time division multiplexed information, said time division multiplexed information being arranged to form recurring multiframes, each of said multiframes having a plurality of frames, each of said frames having a plurality of message time slots and a lesser plurality of nonmessage time slots, a fast rate channel being constituted by corresponding message time slot in each of said frames, a slow rate channel being constituted by corresponding nonmessage time slots in a multiplicity of consecutive frames less in number than said plurality of frames, said apparatus comprising:

a plurality of memory sets, each of said sets having a plurality of memory locations equal in number to the total number of time slots in one of said frames;

write means for writing message bits and nonmessage bits from said incoming message and nonmessage time slots associated with one of said frames into corresponding memory locations in one of said memory sets;

read circuit means for subsequently reading so stored message and nonmessage bits from said memory set, said read out means having a read output terminal for furnishing so-read out bits;

delay means having a delay input connected to said output terminal of said read circuit means and a delay output terminal, for delaying slow channel bits furnished at said read output terminal for a predetermined time period and furnishing so-delayed slow channel bits at said delay output terminal;

combining means having a first input connected to said delay output terminal, a second input, a control input, and a combining output for furnishing said outgoing multiplexed information;

means directly connecting said read output terminal to said second input of said combining means; and control means connected to said combining means for connecting said delay output to said combining output during nonmessage time slots of said outgoing multiplexed information, and to said second input during message time slots of said outgoing multiplexed information.

2. Apparatus as set forth in claim 1, wherein said delay means comprises a delay memory, means for recording data from said nonmessage time slots into said delay memory, and means for reading said nonmessage bits from said delay memory at time instants corresponding to said nonmessage time slots of said outgoing multiplexed information.

3. Apparatus as set forth in claim 1, wherein said delay means further comprises input register means interconnected between said delay input and said read out output, and output register means connected between said delay output and said first input of said combining means;

and wherein said control means further comprises means for shifting slow channel bits into said input register means, recording so entered slow channel bits in said delay memory, and reading so stored slow channel bits into said output shift register means in shift time periods corresponding to said nonmessage time slots of said outgoing multiplexed information.

* * * * *